United States Patent
Handte et al.

(10) Patent No.: US 10,999,013 B2
(45) Date of Patent: May 4, 2021

(54) MULTIPLE STREAM SPACE-TIME BLOCK CODING

(71) Applicant: Sony Corporation, Tokyo (JP)

(72) Inventors: Thomas Handte, Stuttgart (DE); Dana Ciochina, Stuttgart (DE); Felix Fellhauer, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/623,778

(22) PCT Filed: Jul. 9, 2018

(86) PCT No.: PCT/EP2018/068579
§ 371 (c)(1),
(2) Date: Dec. 18, 2019

(87) PCT Pub. No.: WO2019/011878
PCT Pub. Date: Jan. 17, 2019

(65) Prior Publication Data
US 2020/0145137 A1 May 7, 2020

(30) Foreign Application Priority Data
Jul. 11, 2017 (EP) .................................. 17180740
Jan. 10, 2018 (EP) .................................. 18151013

(51) Int. Cl.
*H04L 1/06* (2006.01)
*H04B 7/0417* (2017.01)
(Continued)

(52) U.S. Cl.
CPC ......... *H04L 1/0618* (2013.01); *H04B 7/0417* (2013.01); *H04B 7/0617* (2013.01); *H04B 7/0669* (2013.01); *H04B 7/10* (2013.01)

(58) Field of Classification Search
CPC ...... H04B 7/0669; H04B 7/0617; H04B 7/10; H04B 7/0697; H04B 7/0417;
(Continued)

(56) References Cited

U.S. PATENT DOCUMENTS 8,599,803 B1 * 12/2013 Zhang ............... H04L 1/0643
370/338
2006/0182199 A1 * 8/2006 Hong ................. H04L 1/0003
375/299
(Continued)

FOREIGN PATENT DOCUMENTS

EP          2600556 A2    6/2013
WO     2007/111456 A2   10/2007
(Continued)

OTHER PUBLICATIONS

International Search Report and Written Opinion dated Dec. 12, 2018 for PCT/EP2018/068579 filed on Jul. 9, 2018, 18 pages.
(Continued)

*Primary Examiner* — Khanh C Tran
(74) *Attorney, Agent, or Firm* — Xsensus LLP

(57) ABSTRACT

Transmitter having multiple transmit antennas for transmitting two or more streams. The transmitter comprises an encoding circuitry configured to perform space-time block encoding to obtain for at least one of the two or more streams a pair of space-time encoded streams. Further, a mapping circuitry is configured to assign each stream of each pair of space-time encoded streams to a transmit antenna of the multiple transmit antennas for wirelessly transmitting the two or more streams. Finally, a control circuitry is configured to adjust one or more parameters of the mapping circuitry in order to achieve a defined channel characteristic between the transmitter and a receiver.

28 Claims, 16 Drawing Sheets

(51) Int. Cl.
*H04B 7/06* (2006.01)
*H04B 7/10* (2017.01)

(58) Field of Classification Search
CPC .. H04B 7/0689; H04B 7/0408; H04B 7/0678; H04L 1/0625; H04L 1/0009; H04L 1/0618; H04L 1/0668; H04L 1/0643; H04L 1/0026; H04L 1/0631; H04L 1/0057; H04L 25/0242; H04L 27/22; H04L 27/2601; H04L 5/0023; H04L 5/006; H04L 5/0016
See application file for complete search history.

(56) References Cited

U.S. PATENT DOCUMENTS

| | | | | |
|---|---|---|---|---|
| 2009/0245153 | A1* | 10/2009 | Li | H04B 7/0452 370/312 |
| 2010/0226415 | A1* | 9/2010 | Mehta | H04L 1/0625 375/219 |
| 2013/0202001 | A1* | 8/2013 | Zhang | H04L 29/10 370/476 |
| 2013/0272147 | A1* | 10/2013 | Vermani | H04B 7/0891 370/252 |
| 2015/0146653 | A1* | 5/2015 | Zhang | H04L 27/2627 370/329 |
| 2016/0294451 | A1* | 10/2016 | Jung | H04B 17/20 |

FOREIGN PATENT DOCUMENTS

| | | |
|---|---|---|
| WO | 2008/024462 A2 | 2/2008 |
| WO | 2012/148487 A1 | 11/2012 |

OTHER PUBLICATIONS

"Part 11: Wireless LAN Medium Access Control (MAC) and Physical Layer (PHY) Specifications—Amendment 7: Enhanced throughput for operation in license-exempt bands above 45 GHz," Draft Standard for Information Technology—Telecommunications and Information Exchange Between Systems—Local and Metropolitan Area Networks—Specific Requirements, IEEE P802.11ay™/ D0.4, IEEE, NY, USA, May 2017, 259 pages.

Alamouti, S. M., "A Simple Transmit Diversity Technique for Wireless Communications," IEEE Journal on Select Areas in Communications, vol. 16, No. 8, Oct. 1998, pp. 1451-1458.

Lee, H., et al., "A New Two-Step Precoding Strategy for Closed-Loop MIMO Systems," IEEE Transactions on Communications, vol. 57, No. 3, Mar. 2009, pp. 861-870.

* cited by examiner

| B0 | B1 | B2 | B3 | B4 | B5 | B6 |
|---|---|---|---|---|---|---|
| Phase Hopping Supported | Open Loop Precoding Supported | DCM π/2-SQPSK Supported | Short CW Punctured Supported | Short CW Superimposed Supported | Long CW Punctured Supported | Long CW Superimposed Supported |
| 1 | 1 | 1 | 1 | 1 | 1 | 1 |

Bits:

| B7 B9 | B10 B12 | B13 | B14 | B15 |
|---|---|---|---|---|
| SC Maximum Number of SU-MIMO Spatial Streams Supported | OFDM Maximum Number of SU-MIMO Spatial Streams Supported | NUC TX Supported | NUC RX Supported | π/2-8-PSK Supported |
| 3 | 3 | 1 | 1 | 1 |

Bits:

| B16 B17 | B18 B23 |
|---|---|
| STBC supported | Reserved |
| 2 | 6 |

Bits:

Fig. 16

MULTIPLE STREAM SPACE-TIME BLOCK CODING

CROSS-REFERENCE TO RELATED APPLICATIONS

The present application is based on PCT filing PCT/EP2018/068579, filed Jul. 9, 2018, and claims priority to EP 17180740.7, filed Jul. 11, 2017, and EP 18151013.2, filed Jan. 10, 2018, the entire contents of each are incorporated herein by reference.

BACKGROUND

Field of the Disclosure

The present disclosure relates to a transmitter having multiple transmit antennas for transmitting two or more streams. Furthermore, the present disclosure relates to a corresponding transmission method and a corresponding receiver.

Description of Related Art

Communication systems in the 60 GHz frequency range suffer from strong free space path loss, which increases with frequency. For instance, a 60 GHz communication system has roughly 22 dB higher attenuation compared to a communication system operating at 5 GHz. To overcome the increased path loss, 60 GHz or any mm-wave communication system employs beamforming, i.e. transmitter and/or receiver feature a steerable phased-array antenna (PAA), which can form directive beams towards the other communication device. Typically, beamforming in 60 GHz system focuses on a single dominant path.

However, this has drawbacks in vivid environments, where blockage of particular dominant paths can occur. For example, it may happen that a person is walking through a dominant path and, since mm-wave signals are strongly attenuated by human bodies, the signal is typically lost and communication is interrupted.

One concept to alleviate this drawback is using beamforming which focuses on several dominant paths and thereby creating multiple spatial channels over which data can be transmitted redundantly. Furthermore, data transmitted via the redundant paths is interconnected such that a receiver is capable of extracting the original data even if some dominant paths are occasionally blocked by moving objects.

In order to exploit the redundant paths efficiently, space-time block coding (STBC) can be applied, according to which a data stream to be transmitted is encoded in blocks which are distributed among antennas and across time. The diversity created thereby can be utilized to reconstruct the original data stream on the receiver side even if some parts of a transmission signal are not correctly received.

Generally, an orthogonal STBC is envisaged, in which all vectors representing any pair of columns taken from a coding matrix of the STBC are orthogonal. The result is that a signal can be decoded on the receiver side in a simple, linear manner, and thus a simple and efficient receiver design is feasible.

There is only one STBC code, the Alamouti code, which is orthogonal and at the same time allows a code rate of 1 for complex-valued transmit symbols. In other words, there is only one STBC code which does not sacrifice some proportions of its data rate to achieve full orthogonality.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a transmitter capable of transmitting two or more streams over multiple transmit antennas with redundancy for blockage suppression at a high data rate. It is a further object to provide a transmission method which, when implemented on a device, achieves redundancy for blockage suppression and provides a high data rate. Yet further, it is an object to provide a corresponding receiver as well as a computer program for implementing the disclosed transmission method and a non-transitory computer-readable recording medium that stores therein a corresponding computer program product.

According to an aspect there is provided a transmitter having multiple transmit antennas for transmitting two or more streams comprising: an encoding circuitry configured to perform space-time block encoding to obtain for at least one of the two or more streams a pair of space-time encoded streams; a mapping circuitry configured to assign each stream of each pair of space-time encoded streams to a transmit antenna of the multiple transmit antennas for wirelessly transmitting the two or more streams; and a control circuitry configured to adjust one or more parameters of the mapping circuitry in order to achieve a defined channel characteristic between the transmitter and a receiver.

According to a further aspect there is provided a transmission method for transmitting two or more streams via multiple transmit antennas, the method comprising the steps of: performing, with an encoding circuitry, space-time block encoding to obtain for at least one of the two or more streams a pair of space-time encoded streams; assigning, with a mapping circuitry, each stream of each pair of space-time encoded streams to a transmit antenna of the multiple transmit antennas for wirelessly transmitting the two or more streams; and adjusting, with a control circuitry, one or more parameters of the mapping circuitry in order to achieve a defined channel characteristic between the transmitter and a receiver.

According to yet a further aspect there is provided a receiver for receiving two or more streams from a transmitter, comprising one or more receive antennas configured to capture a transmit signal from the transmitter, at least one decoding circuitry for decoding space-time encoded streams, and an output circuitry for outputting the two or more streams transmitted from the transmitter, wherein at least one of the two or more streams from the transmitter is space-time encoded into a pair of space-time encoded streams, and wherein the decoding circuitry is configured to decode the at least one pair of space-time encoded streams in order to receive one of the two or more streams transmitted from the transmitter.

Embodiments are defined in the dependent claims. It shall be understood that the disclosed transmission method, the disclosed computer program, the disclosed computer-readable recording medium, and the disclosed receiver have similar and/or identical further embodiments as the claimed transmitter and as defined in the dependent claims and/or disclosed herein.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 16 shows an exemplary capability field for indicating STBC capability.

DETAILED DESCRIPTION OF THE EMBODIMENTS

Figure 1:
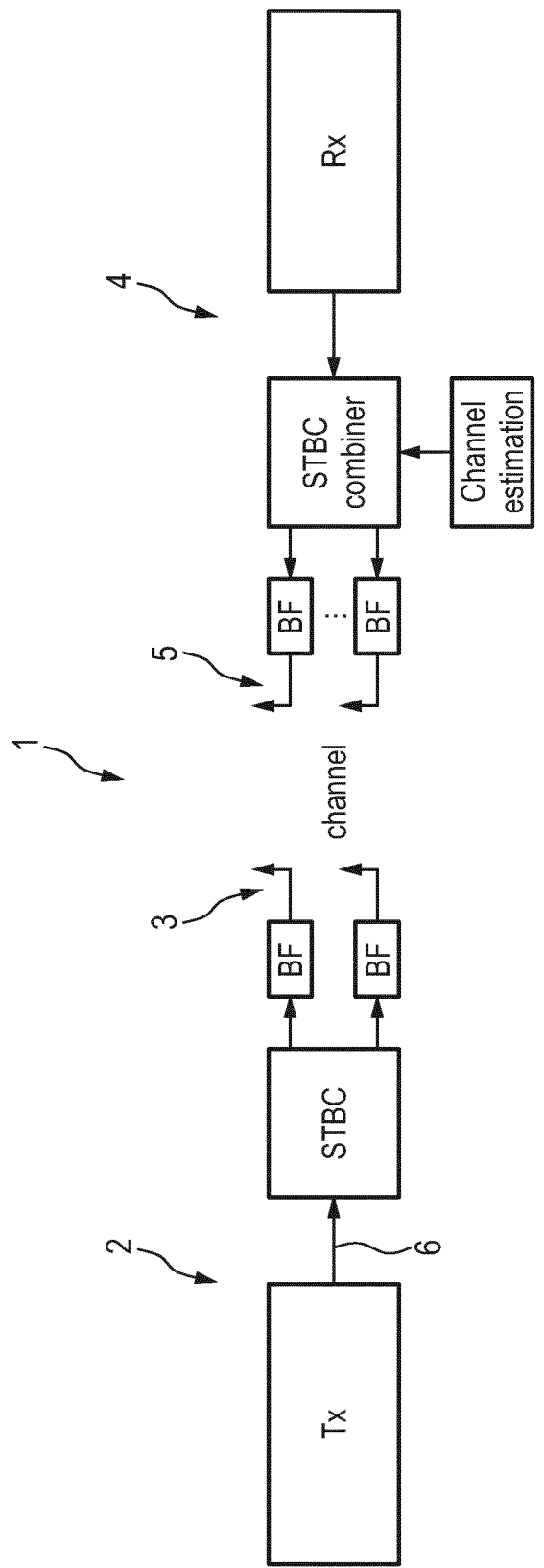
FIG. 1 shows a schematic diagram of a communication system utilizing Alamouti STBC according to a conventional scheme.

Referring now to the drawings, wherein like reference numerals designate identical or corresponding parts throughout the several views, FIG. 1 shows a schematic diagram of a communication system utilizing Alamouti STBC according to a conventional scheme. The communication system according to the prior art is denoted here as a whole with reference numeral 1.

The communication system 1 comprises a transmitter 2 having two transmit antennas 3 and a receiver 4 having at least one receive antenna 5. The transmitter is configured to transmit a single stream 6 to the receiver 4. The depicted constellation is a preferred constellation for applying STBC, since a coding rate of 1 can be achieved by full orthogonality using the Alamouti STBC scheme. The code rate is defined as the number of symbols encoded per time slot on an average over the course of one block.

The Alamouti STBC operates in two time slots. In the first time slot $\kappa$ two transmit symbols $s_{1,k}$ and $s_{2,k}$ (in vector notation: $\vec{S}_\kappa = (s_{1,k}\ s_{2,k})$) are transmitted over a first and a second transmit antenna, respectively. In a second time slot $\kappa+1$ the symbols $s_{2,k}^*$ and $s_{1,k}^*$ or $\vec{S}_{\kappa+1} = (-s_{2,k}^*\ s_{1,k}^*)^T$ are transmitted over the first and the second transmit antenna, respectively.

At the receiver side, the receive signals at point in time $\kappa$ and $\kappa+1$, $r_\kappa$ and $r_{\kappa+1}^*$, are combined in a vector $R_k = (r_\kappa\ r_{\kappa+1}^*)^T$ and multiplied with the following coding matrix:

$$\begin{bmatrix} h_{11}^* & h_{12} \\ h_{12}^* & -h_{11} \end{bmatrix}$$

where $h_{11}$ and $h_{12}$ denote the channel coefficients from the first and the second transmit antenna to the receive antenna, respectively, and where * denotes complex conjugate.

The output can be shown to be:

$$(y_1 y_2)^T = (|h_{11}|^2 + |h_{12}|^2) \cdot (s_{1,k} s_{2,k})^T.$$

It is readily apparent that this is a rate-1 code. It takes two time-slots to transmit two symbols. Furthermore, it is the only orthogonal STBC that achieves such rate. That is to say that it is the only STBC for complex modulation symbols that can achieve its full diversity gain without needing to sacrifice its data rate. Since almost all constellation diagrams rely on complex numbers, this property usually gives Alamouti's code a significant advantage over the higher-order STBCs even though they achieve a better error-rate performance.

While the Alamouti scheme requires specifically two transmit antennas, it can be generalized to several receive antennas. In this case $$(y_1 y_2)^T = \sum_{i=1}^{N} \sum_{j=1}^{2} |h_{ij}|^2 \cdot (s_{1,k} s_{2,k})^T$$

holds and provides even more redundancy/reliability. In other words, any channel matrix of size 2×N with N≥1 receive antennas can be used for Alamouti STBC.

The Alamouti code, which is capable of achieving a code rate of 1, supports only two transmit antennas and two time slots. Other STBCs for configurations with a different number of streams, space-time streams, and/or time slots have drawbacks in terms of rate smaller 1 (i.e. less than one symbol per time slot can be conveyed) or in terms of orthogonality loss (i.e. some residual interference remains between receive symbols). It has been mathematically proven that no other STBC with rate 1 exists for complex-valued transmit symbols. From an implementation point of view, orthogonality and a small number of time slots is favorable, as spatial equalizer structures are simple and memory requirements are low.

Figure 2:
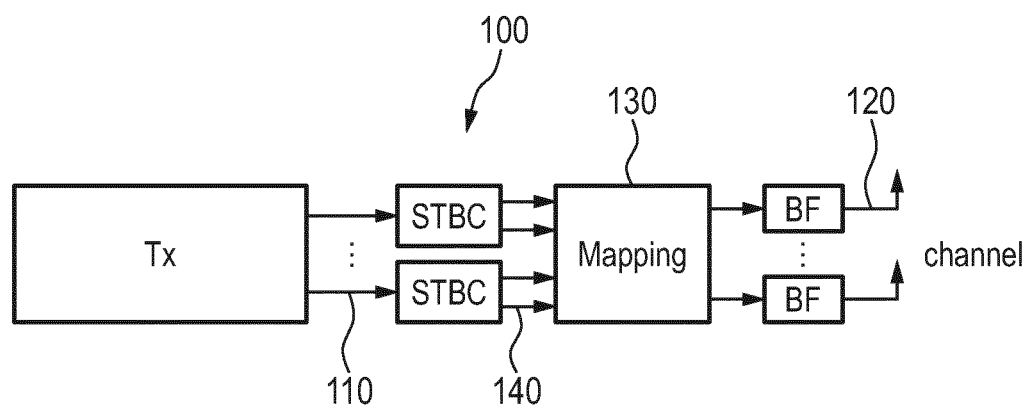
FIG. 2 shows a schematic diagram of an exemplary embodiment of a transmitter according to an aspect of this disclosure.

FIG. 2 shows a schematic diagram of an exemplary embodiment of a transmitter according to an aspect of this disclosure. A transmitter according to an aspect of this disclosure is denoted here as a whole with reference numeral 100 and is capable of transmitting two or more individual data streams 110 to a receiver (not depicted in FIG. 2).

For this purpose, the transmitter 100 comprises multiple transmit antennas 120. Preferably, the transmitter 100 comprises at least four individual transmit antennas, however, in other embodiment a transmitter 100 with only three transmit antennas is also conceivable. As will be outlined further below in case of an odd number of transmit antennas, at least one data stream of the two or more data streams is not encoded using STBC.

An antenna of the multiple antennas 120 can be a single antenna, having its own radiofrequency-(RF) chain, or a phased-array antenna (PAA) with a plurality of antenna elements, which are connected via phase shifters to a common RF-chain. The phase shifters are used to control the main direction(s) of the beam(s) generated by the PAA.

Furthermore, the transmitter 100 comprises a mapping circuitry 130 which is capable of assigning individual (symbol) streams to individual antennas of the plurality of transmit antennas 120. The assignment by the mapping circuitry 130 is not static, but can be changed dynamically. More specifically, the transmitter 100 comprises a control circuitry (not depicted here) which can dynamically adjust the assignment of the mapping circuitry 130 based on various parameters as will be described in more detail later.

The symbol streams assigned by the mapping circuitry 130 are space-time streams 140 obtained by space-time block encoding of the two or more data streams 110 to be transmitted by the transmitter 100. In particular, for each data stream 110 to be transmitted two space-time streams 140 are generated by STBC, preferably using Alamouti STBC, as outlined above.

The space-time streams 140 are subsequently assigned to the individual transmit antennas 120 by the mapping circuitry 130 such that a defined channel characteristic is achieved. In particular, the mapping circuitry 130 is adjusted in a manner that only little or no interferences are observed between the individual transmit streams. This can be achieved inter alia by adjusting the assignment based on previously conducted beamforming training or by continuously receiving channel feedback from a receiver and adjusting parameters of the mapping circuitry 130 accordingly.

Hence, one aspect of this disclosure is to apply STBC to more than one data streams and to transmit the encoded data using more than two transmit antennas while at the same time maintaining an optimal data rate, preferably a coding rate of 1. The disclosed solution achieves this by processing each data stream individually to obtain for at least one of the data streams, preferably each data stream, two space-time symbol streams which are mapped onto multiple transmit antennas such that a defined channel characteristic is achieved. The defined channel characteristic provides that the space-time streams are transmitted in a non-interfering manner. In other words, according to an aspect of the disclosure, the transmitter is utilizing an optimal, orthogonal STBC for each individual stream to obtain optimal space-time streams, which are mapped onto the transmit antennas such that they do not interfere with each other.

It should be noted that the disclosed scheme is particularly (but not only) usable for mm-wave signals, where several beams can be combined by the proposed scheme to achieve higher link reliability in case of beam blockage for example. Mm-wave channel conditions are favorable for the proposed scheme to operate. Nevertheless, the present scheme is not limited to mm-wave signals.

Details of the assignment process will be explained with reference to FIG. 3.

Figure 3:
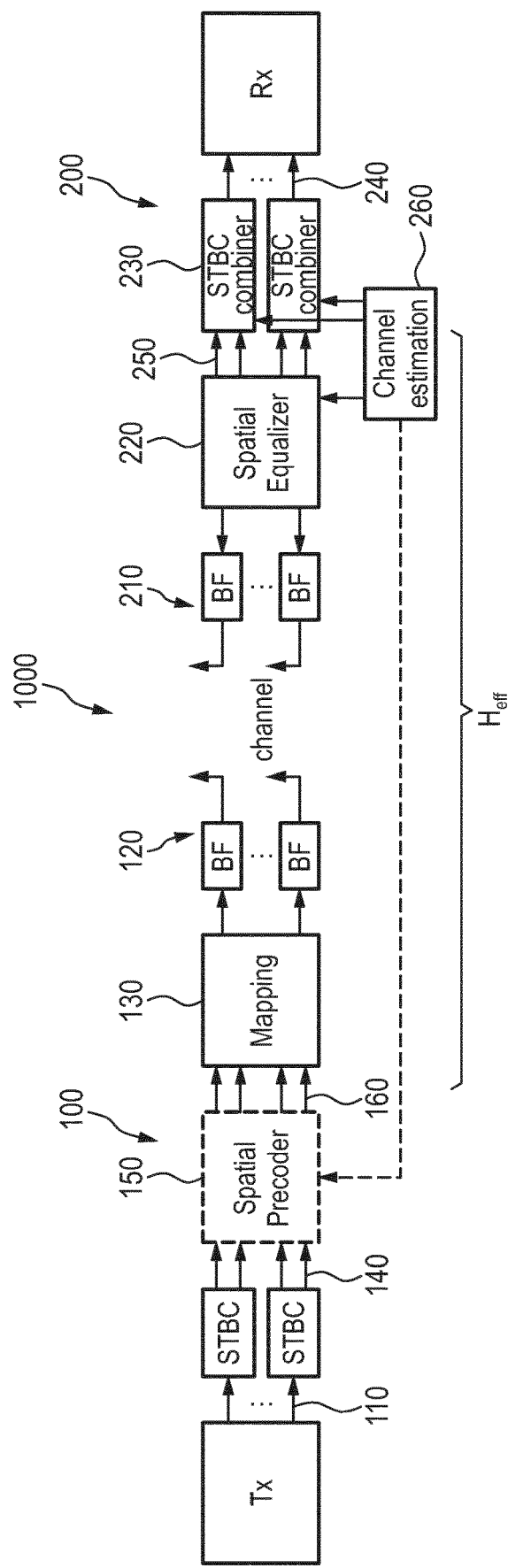
FIG. 3 shows in a schematic diagram a communication system with an exemplary embodiment of a transmitter and receiver according to an aspect of this disclosure.

FIG. 3 shows in a schematic diagram a communication system 1000 with a preferred exemplary embodiment of a transmitter 100 and a receiver 200 according to this disclosure. In the communication system 1000 a number of p spatial data streams 110 are processed by the transmitter 100 and transmitted to the receiver 200. In this embodiment, each spatial stream 110 is processed independently by the STBC encoding rules. Thus, each of the p data streams 110 is converted in two space-time streams, resulting in a total of 2p space-time streams 140. The 2μ space-time streams are fed in this embodiment into a spatial precoder 150.

The spatial precoder 150 is configured to compute and apply a block diagonalization of an effective channel matrix or a permutation of a block diagonalization of an effective channel matrix in order to refine the mapping of the mapping circuitry 130. In particular, the spatial precoder 150 is configured to perform an appropriate weighting of space-time streams 140. The spatial precoder 150 may rely on channel feed back provided from a channel estimation circuitry 260 of the receiver 200.

Following the spatial precoder 150, the mapping circuitry 130 performs an assignment of the weighted space-time streams 160 to the multiple transmit antennas 120 in order to achieve a defined channel characteristic, which can be described by an effective channel matrix $H_{eff}$ with a defined structure. For μ spatial streams 110 to be transmitted at least 2μ transmit antennas 120 should be available, since if the number of spatial streams is μ, the number of space-time streams 140 according to the proposed scheme will be 2μ, if all input streams are STBC encoded. In case not all input data streams are encoded the number of antennas may also be an odd number as will be outlined latter on.

Furthermore, it shall be noted that a spatial precoder 150 is optional. A defined channel characteristic may be achieved in other embodiments by the mapping circuitry 130 alone, or preferably by the mapping circuitry in conjunction with transmit beamforming.

The spatial precoder 150, if present, performs a linear combination of the space-time streams 140 according to e.g. well-known block diagonalization techniques from linear algebra. It shall be noted that in another embodiment the optional spatial precoder 150 and the mapping circuitry 130 may be combined in a single unit if the same functionality can be preserved.

The receiver 200 comprises a number of Ñ receive antennas 210 in order to capture a signal transmitted from the transmitter 100. It should be noted that Ñ can be 1, and that the receiver 200, in contrast to the transmitter 100, may thus only have a single antenna. In other words, the receiver is not required to have multiple antennas. Nevertheless, by having multiple receive antennas 210 the redundancy and reliability of the reception can be further improved.

For reception, a signal received at the receive antennas 210 is at first passed to a spatial equalizer 220, which equalizes the channel influence in an appropriate way. The output of the spatial equalizer 220 is then passed to p STBC combiners 230, each generating from a pair of space-time encoded streams a single output stream 240 that corresponds to one of the spatial streams 110 transmitted from the transmitter 100. It should be noted that similar to the encoding, the decoding by the p STBC combiners can be performed by a single decoding hardware and therefore the p STBC encoder and the p STBC combiners in this example may not necessarily correspond to individual hardware units as depicted in FIG. 3. Furthermore, the receiver 200 may provide channel feed back to the transmitter 100 using a channel estimation circuitry 260.

In order to achieve a reasonable link quality, one or more parameters of the beamformer and/or equalizer and/or precoder and/or mapper of the transmitter are adapted to achieve a desired channel characteristic. Further, parameters of the receiver may be adjusted in addition in order to obtain the desired channel characteristic. The desired channel characteristic can be described by an effective channel matrix $H_{eff}$ seen between STBC encoders and STBC combiners. In order to achieve the desired channel characteristic, parameters of the transmitter or the receiver are adjusted such that the effective channel matrix $H_{eff}$ is preferably an essentially block diagonal matrix or a permutation of an essentially block diagonal matrix such as for instance:

$$H_{eff} = \begin{bmatrix} B_1 & 0 & 0 \\ 0 & B_i & 0 \\ 0 & 0 & B_\mu \end{bmatrix}$$

wherein each element of the matrix may represent another matrix B such that matrix $H_{eff}$ is a matrix of matrices. A basic matrix element $B_i$ has size $2 \times N_i$ and can have arbitrary entries. The number of receive antennas $\tilde{N}$ can be chosen arbitrarily, but has the following lower bound $\tilde{N} = \Sigma_{i=1}^\mu N_i$ for linear equalizer structures.

In order to achieve the desired $H_{eff}$ structure, several techniques are conceivable. For instance, in one embodiment polarization multiplex can be performed with two concurrent beams. Beamforming is done in this embodiment such that each beam is aligned to dominant paths. The spatial precoding is here not required, and the spatial equalizer of the receiver is set to suppress polarization mixture by polarization misalignment, which may occur due to geometrical transmitter and receiver antenna misalignment. According to this embodiment, each of the µ=2 concurrent beam sets forms a $B_i$ block matrix of size $2 \times N_i$. The block matrices are independent from each other. Depending on receiver implementation, $N_i$ can be 2 in case of directive reception or 1 in case of an omnidirectional reception.

In another embodiment, polarization multiplex can be performed in combination with spatial separation. In this embodiment, two spatially separated antennas support two polarizations each and beamforming is also done such that each beam is aligned to dominant paths. The spatial precoder is, as in the previous embodiment, not required, and the spatial equalizer is set to suppress unwanted polarization mixture.

Additionally, it should be noted that any (well-conditioned) spatial configuration can be transformed in a block matrix structure by block diagonalization. Corresponding methods rely on a spatial precoder and equalizer structures applying methods from linear algebra such as "Jordan normal form" or "Block LDU decomposition", for example. The applied methods define a spatial precoder matrix P and an equalizer matrix W.

Generally, the effective channel matrix can be defined as:

$$H_{eff} = W \cdot V \cdot H \cdot U \cdot T \cdot P$$

wherein P accounts for the spatial precoder, T represents the mapping circuitry, U represents beamforming at transmitter side, H is the physical channel, V represents beamforming at receiver side, and W represents the spatial equalizer at receiver side.

As can be derived from the formula, there are further approaches conceivable to achieve the desired $H_{eff}$ structure, since $H_{eff}$ also includes beamforming at transmitter and receiver side as well as precoding and equalization. Apart from the physical channel, all matrices W, V, U, T and P may be influenced in order to achieve the desired effective channel matrix. Thus, there are at least five degrees of freedom to realize the desired block diagonal matrix structure. As channel and matrices may be frequency-selective, the above equation should be interpreted on a narrow-band frequency tap basis. Furthermore, T and P may be represented by a single matrix $\tilde{P}$, if a combined spatial precoder and mapping circuitry is being used and their function is provided by a single entity.

It should be noted that each matrix W, V, U, T and P in the above formula may be different in size depending on the physical setup such as the number of antennas and/or the number of antenna elements at transmitter and receiver side.

Moreover, depending on physical setup, it may happen that a block-diagonal structure of $H_{eff}$ can be achieved after an appropriate re-sorting of columns and rows which corresponds to interchanging transmit and receive antenna order. Alternatively, a particular assignment of space-time streams by the mapping circuitry at transmitter and/or receiver achieves the same result.

Furthermore, in another embodiment the mapping circuitry may be configured to assign streams of a first pair of space-time encoded streams such that the first pair of space-time encoded streams is transmitted over a part of the effective channel matrix which has a non-diagonal structure, whereas streams of a further pair of space-time encoded streams are assigned such that the further pair is transmitted over a part of the effective channel matrix which has an essentially diagonal or quasi-diagonal structure.

Figure 4:
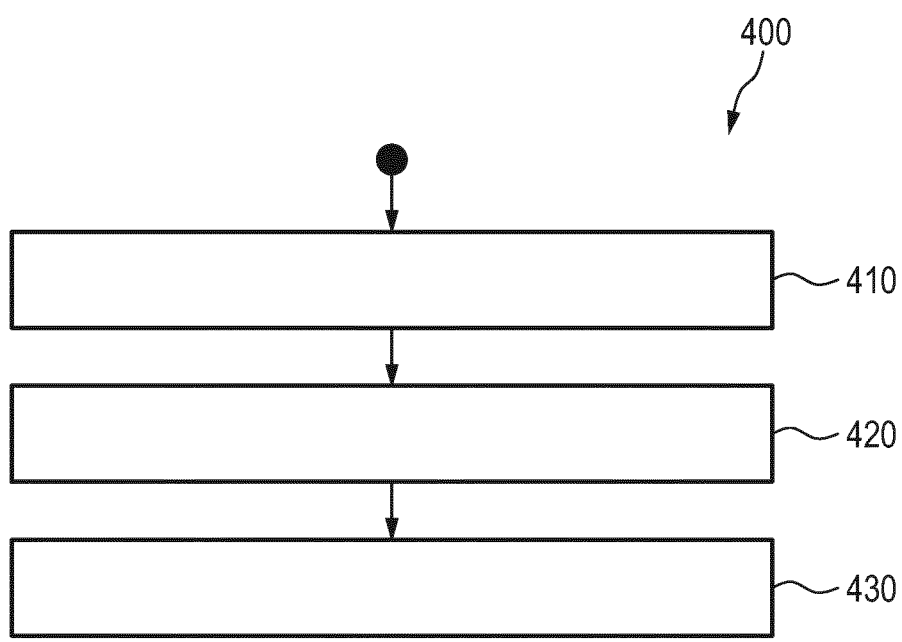
FIG. 4 shows in a flow chart an exemplary embodiment of the transmission method according to the present disclosure.

FIG. 4 shows in a simplified flow chart the essential steps of a corresponding transmission method. The method as whole is denoted with reference numeral 400. It should be noted that the method is not limited to the depicted steps or the order thereof, but may have additional steps in between or in parallel. In particular, the method refers to the signal processing preformed by a transmitter according to the present disclosure.

In step 410, space-time block encoding is performed by an encoding circuitry to obtain for at least one of two or more streams a pair of space-time encoded streams. Preferably, if the number of transmit antennas is an even number each of the two or more streams is encoded into a pair of space-time encoded streams.

Subsequently, in step 420, each stream of each pair of space-time encoded streams is assigned by a mapping circuitry to a separate transmit antenna of the multiple transmit antennas for wirelessly transmitting the two or more streams.

Finally, in step 430, one or more parameters of the mapping circuitry are adjusted by a control circuitry in order to achieve a defined channel characteristic between the transmitter and a receiver. Preferably, further parameters such as parameters of the beamformer and/or the precoder, for instance, are adjusted as well.

In particular, in the last step it is an aim to adjust the mapping and/or other parameters of the transmitter such that an effective channel matrix $H_{eff}$ is being achieved. In other words, the control circuitry tries in this step to optimize the parameters U, T, P on the transmitter side in order to influence the channel characteristic in a desired manner. Depending on the desired complexity of the transmitter and/or the receiver only certain entities of the transmitter and/or receiver are designed such that there parameters may be changed and/or adjusted dynamically. Preferred configurations are depicted in FIG. 5.

Figure 5:
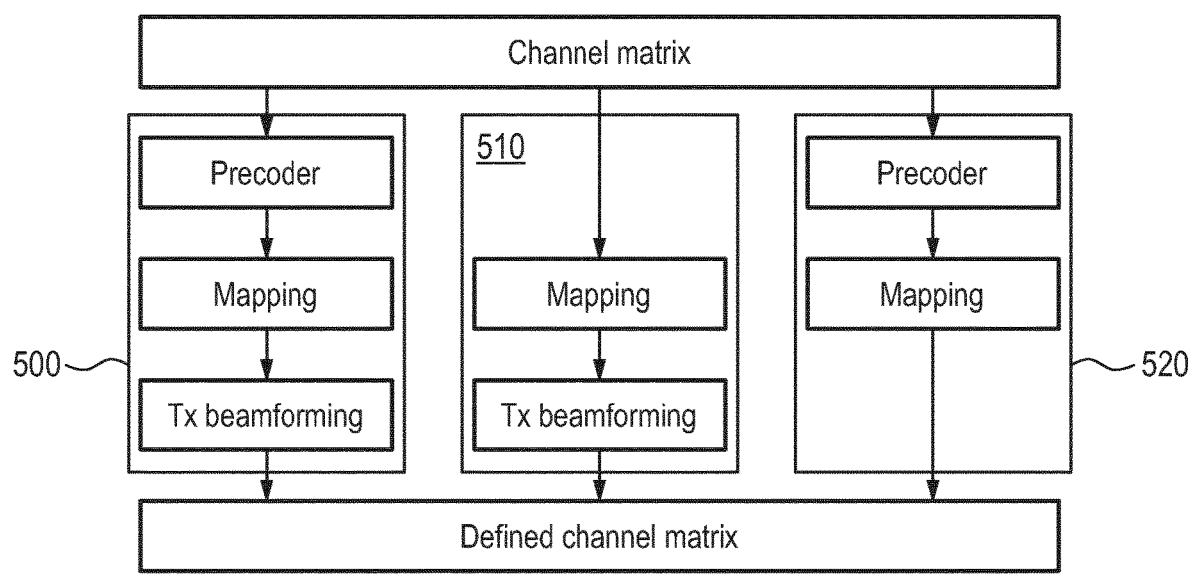
FIG. 5 shows preferred configurations of exemplary embodiments of a transmitter in order to achieve a defined channel matrix.

FIG. 5 shows preferred configurations of exemplary embodiments in order to achieve a defined channel matrix. In a first configuration 500 the transmitter is capable of adjusting the precoder, the mapping and the transmit beamforming, hence, the parameter matrices P, T and U. In a second configuration 510 the transmitter is capable of adjusting the mapping and the transmit beamforming, hence, the parameter matrices T and U. Finally, in a third configuration 520 the transmitter is capable of adjusting the precoder and the mapping, hence, the parameter matrices P and T. The different configurations allow different implementations of the proposed scheme, and hence allow the implementation of transmitters for various complexity levels.

It is conceivable that under certain circumstance a fully block diagonal structure may not be achievable, since there will be some remaining residual interference from other streams which can be considered as additional noise. In practical implementations, interference will cause the achievable signal-to-noise ratio to be limited to about 20 dB (corresponding to cross-polar discrimination) which is sufficient for higher order modulations.

Under such and other circumstances it can be envisioned that $H_{eff}$ is generated such that it becomes an upper (or lower) triangular block matrix:

$$H_{eff} = \begin{bmatrix} B_1 & C_1 & A_1 \\ 0 & B_i & A_i \\ 0 & 0 & B_\mu \end{bmatrix}$$

In this case a receiver would start decoding the last stream with the $B_\mu$ basic matrix element and continue with the next stream of basic matrix element $B_{\mu-1}$ while using the decoded information of the previously determined receive symbols and matrix $A_{\mu-1}$. Since this method is based on decision feedback, it suffers from error propagation. Upper triangular block matrices can be generated by QR or LU decomposition for example.

Figure 6:
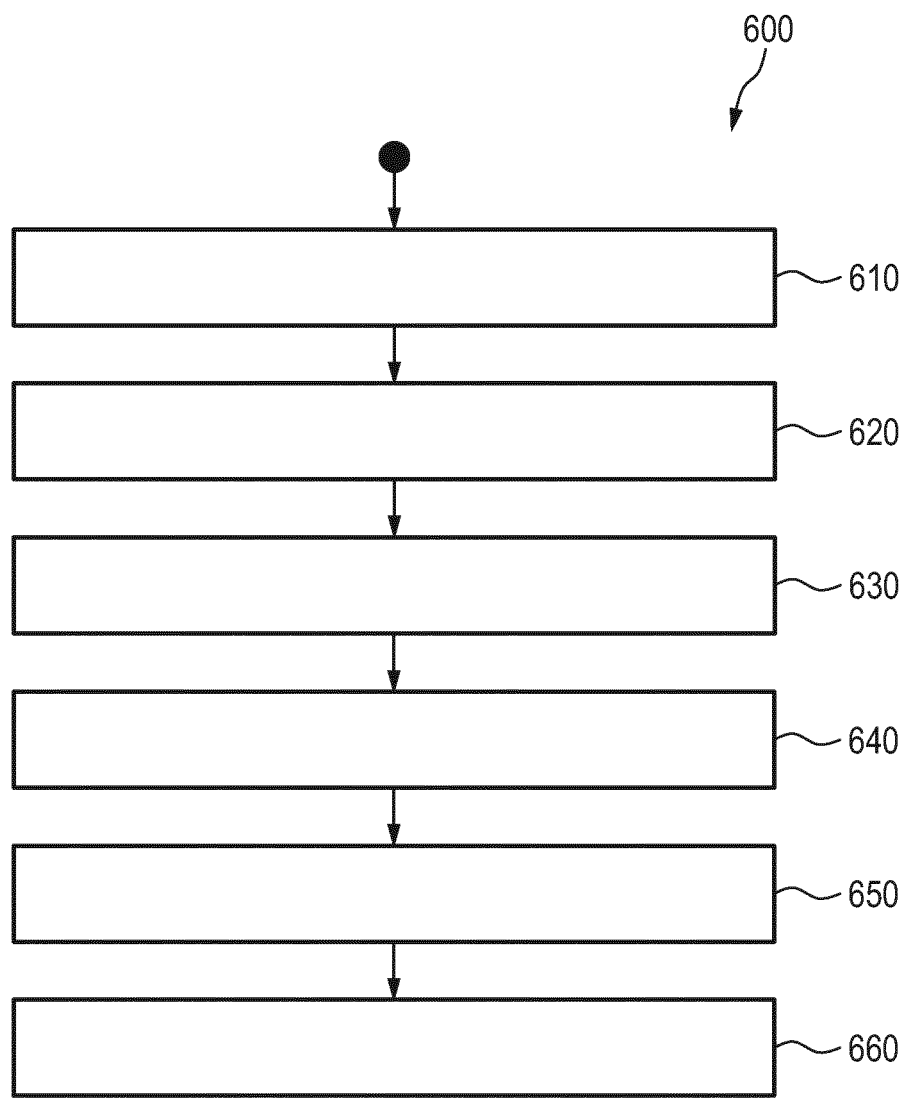
FIG. 6 shows in a flow chart a preferred exemplary embodiment of a transmission method according to the present disclosure.

FIG. 6 is another flow diagram of a transmission method 600. In particular, FIG. 6 illustrates the necessary steps to be performed in order to setup a link using the proposed multiple stream STBC block coding.

At step 610, at first a Single-Input and Single-Output (SISO) beamforming search is performed, for instance, via a sector level sweep (SLS). During the search various training sequences are transmitted with various (not necessarily) different beams. The receiver evaluates these beams with respect to quality (e.g. SNR, link capacity) and provides feedback to the transmitter. Simultaneously, the receiver may adapt its own receive beams based on the training sequences.

At step 620, subsequently, transmit sectors or transmit/receive sector combinations along with the respective antennas which provide sufficient quality for MIMO transmission are identified as a result of the beamforming search.

The sectors identified as suitable for MIMO transmission are then further refined at step 630 by a MIMO beamforming search (e.g. in a beam refinement phase (BRP)) in order to obtain the final MIMO transmission configuration. The MIMO beamforming search will yield a feedback from a receiver about the quality of the trained MIMO channel setup (as in SISO beamforming) which enables the transmitter to decide on the final configuration. It should be noted that in other embodiments step 630 could be the starting point of the method, for instance, in cases in which only a few sectors exist. In other words, steps 610 and 620 are optional.

At step 640, the final transmit sectors or transmit/receive sector combinations along with the respective antennas for MIMO transmission are identified based on the MIMO beamforming search, and the final MIMO transmission configuration is set.

Having determined the final MIMO transmission configuration, at step 650, the mapping circuitry will be adjusted in order to achieve the desired structure of the effective channel matrix such that interference between the space-time streams of independently encoded streams is reduced or avoided completely. In other words, the assignment of space-time streams to the individual transmit beams will be reconsidered and adjusted in order to obtain the desired channel matrix. Additionally, in step 650 parameters of a beamformer and/or a precoder can be adjusted as well in order to achieve the desired channel matrix.

Finally, at step 660, the regular data transfer commences applying the proposed multi stream STBC encoding.

While so far only single user (SU) operations have been considered, in other embodiments the proposed encoding scheme may also be adapted for multi user (MU) operation as will be described in detail with reference to FIG. 7.

Figure 7:
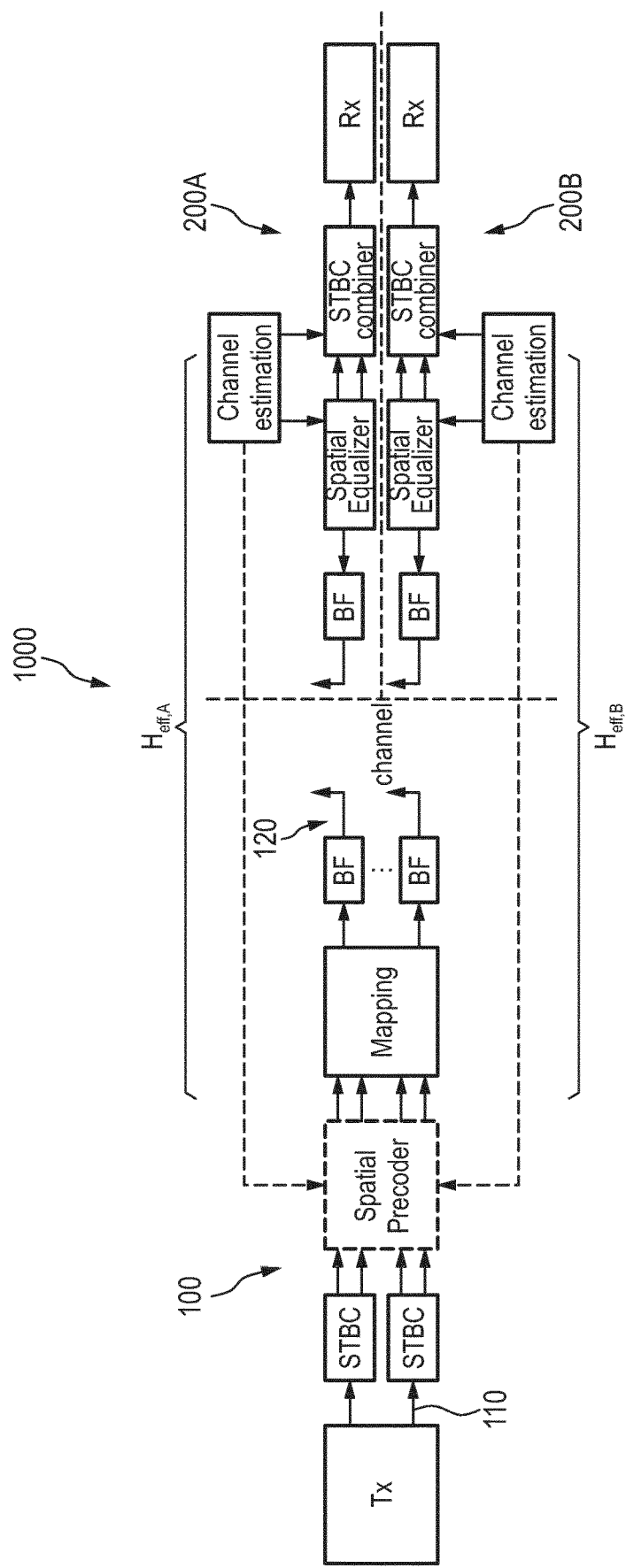
FIG. 7 shows in a schematic diagram a communication system with an exemplary embodiment of a transmitter and two receivers according to an aspect of this disclosure in multi-user (MU) operation.

FIG. 7 shows in a schematic diagram a communication system with an exemplary embodiment of a transmitter according to this disclosure in multi-user (MU) operation. The communication system 1000 comprises a transmitter 100 according to this disclosure and, in contrast to the communication system according to FIG. 3, two receivers 200A, 200B. The receiver 200A is associated to a user A and the receiver 200B is associated to a user B.

The transmitter 100, in this embodiment, is assumed to have at least two data streams 110 which are equally split among the two users A and B. It shall be noted that in other embodiments any arbitrary stream to user allocation is conceivable. In other words, scenarios with more than two users, which are served by a single transmitter, are conceivable as well.

The transmitter 100 encodes the at least two streams according to the proposed STBC scheme and transmits the streams using the multiple transmit antennas 120. However, the adjustment of the mapping circuitry 130 in this embodiment is done based on an joint effective channel matrix $H_{eff}$ representing the effective channel matrix $H_{eff,A}$ as seen between the STBC encoder of the transmitter and the STBC combiner(s) of receiver 200A, and the effective channel matrix $H_{eff,B}$ as seen between the STBC encoder and the STBC combiner(s) of receiver 200B.

In order to achieve a good channel quality the joint channel matrix $H_{eff}$ needs to fulfill a diagonal or triangular block matrix structure. Once again, this may be achieved by an appropriate assignment of the space-time encoded streams by the mapping circuitry 130 of the transmitter 100 and by transmit beamforming or precoding.

That is, the transmitter 100 may generally be configured to allocate a first subgroup of streams to a first receiver and a second subgroup of streams to a further receiver and to adjust one or more parameters of the mapping circuitry in order to achieve a first defined channel characteristic $H_{eff,A}$ between the transmitter and the first receiver 200A and a second defined channel characteristic $H_{eff,B}$ between the transmitter and the second receiver 200B. In particular, the transmitter 100 can be configured to adjust the mapping such that a defined structure of a joint channel matrix which comprises the first and the second channel matrix may be achieved. Preferably, the joint channel matrix has an essentially diagonal or quasi-diagonal structure, in particular, a diagonal structure such as:

$$H_{eff} = \begin{bmatrix} H_{eff,A} & 0 \\ 0 & H_{eff,B} \end{bmatrix}$$

Figure 8:
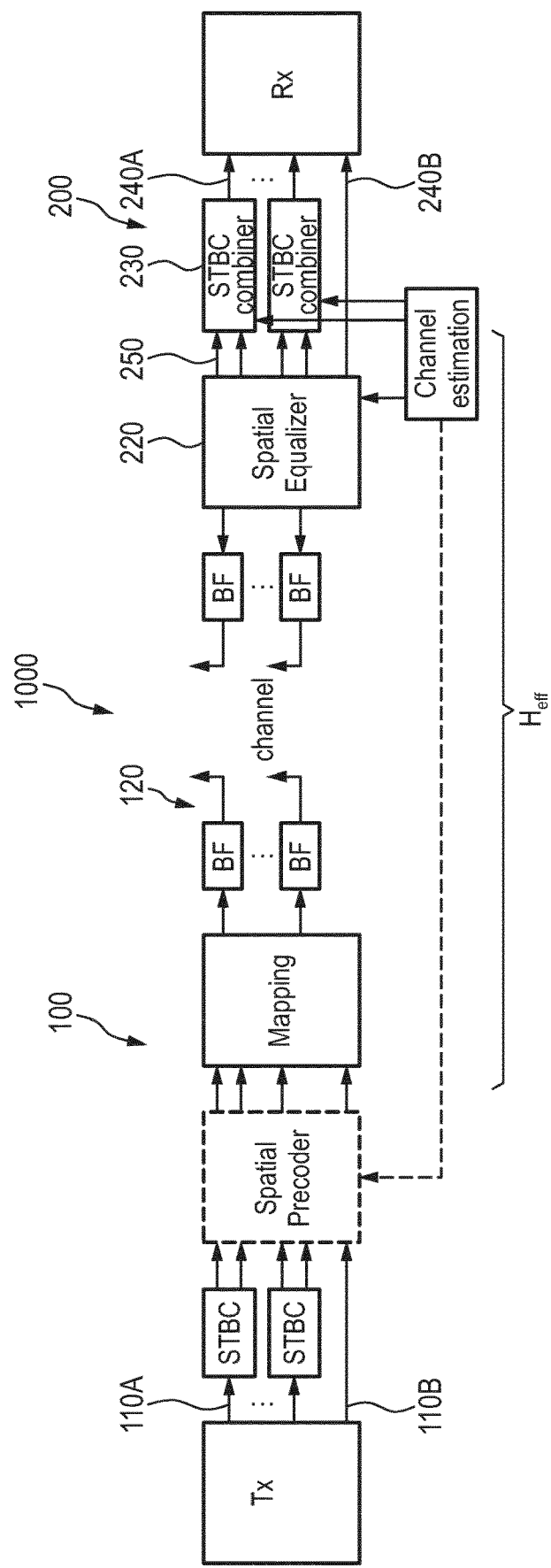
FIG. 8 shows in a schematic diagram a communication system with an exemplary embodiment of a transmitter according to an aspect of this disclosure with an odd number of transmit antennas.

FIG. 8 shows in a schematic diagram a communication system 1000 with an exemplary embodiment of a generalized transmitter according to this disclosure. In this embodiment the transmitter 100 can have an arbitrary number of transmit antennas 120 including odd numbers of transmit antennas.

So far, the proposed scheme requires the number of transmit antennas to be an integer multiple of 2. This is due to the fact that the Alamouti STBC requires two transmit antennas to work properly. In order to make use of an arbitrary number of transmit antennas Q, [Q/2] streams can be encoded with STBC (⌊denotes rounding towards next lower integer), while the remaining either zero or one stream is encoded conventionally.

For example as illustrated in FIG. 8, the transmitter 100 has an odd number (2μ+1) transmit antennas to transmit μ+1 streams 110. Accordingly, p streams 110A are encoded with STBC, while at least one stream 110B bypasses the STBC encoding. For achieving reasonable error rates the stream 110B is encoded conventionally, e.g. by using vertical encoding over streams.

The scheme according to FIG. 8 may be understood as a generalized scheme in which the Alamouti STBC encoding is combined with conventional encoding in order to make use of all available transmit antennas. In other words, the scheme can be used for transmitters having an even or an odd number of transmit antennas, wherein in cases, in which the transmitter has an odd number of transmit antennas, at least one data stream of the two or more streams to be transmitted is not encoded according to Alamouti STBC.

Vertical encoding in this regard means that a (LDPC) code word or parts of it are assigned to different streams. This enables the receiver to (partly) reconstruct transmitted bits in case a particular stream has bad quality (similar to STBC behavior).

In case one of the streams is neither encoded nor decoded by STBC, it is appropriate to apply additional encoding on bit or symbol level with LDPC code for example. Typically, vertical encoding over data streams is appropriate, i.e. the bit stream to be transmitted is blockwise encoded by LDPC. Each output code word is subsequently split to μ+1 streams. In case a particular stream in erroneous due to channel conditions, the LDPC decoder can still recover the bits transmitted via this stream.

In FIG. 8, the receiver 200 comprises one or more STBC combiners 230 each configured to decode a pair of space-time encoded streams 250 in order to obtain a single output stream 240A corresponding to one of the two or more input data streams 110A. Further, the receiver 200 is configured to pass through a received stream 240B, which has not been encoded according to STBC. Preferably, the assignment is done by a spatial equalizer 220 based on an appropriate signaling by the transmitter. An example of such signaling in general and for this particular case will be describe with reference to FIG. 9.

Figure 9:
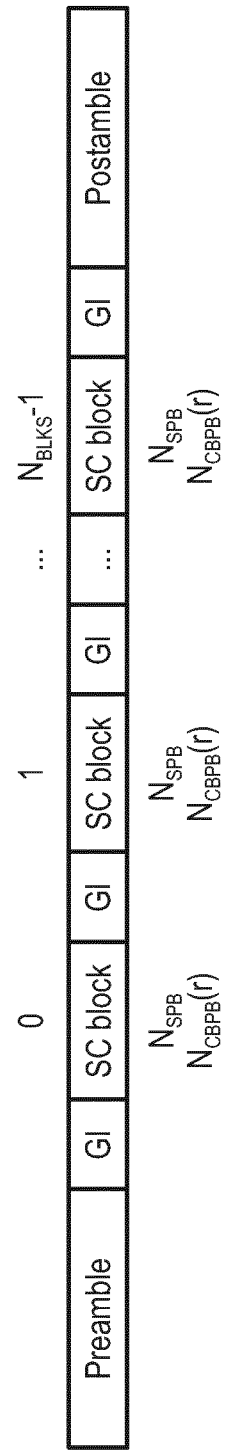
FIG. 9 shows an exemplary implementation in an IEEE802.11ay environment.

FIG. 9 shows an exemplary implementation in an IEEE802.11ay environment. In particular, FIG. 9 shows in a schematic diagram an exemplary block-based single carrier (SC) modulation.

In FIG. 9, each single carrier block contains $N_{SPB}$ (number of symbols per block) symbols and $N_{CBPB}$ (number of coded bits per block) bits. Each symbol combines of $N_{CBPS}$ (number of coded bits per symbol) bit. Obviously, $N_{CBPS}=N_{CBPB}/N_{SPB}$ holds.

$N_{CBPS}$ and $N_{CBPB}$ depend on the applied symbol modulation (e.g. Binary Phase Shift Keying (BSPK), Quaternary Phase Shift Keying (QPSK), or Quadrature Amplitude Modulation (QAM)) and are thus stream dependent, i.e. a function of r. $N_{BLKS}$ is the total number of SC blocks to be transmitted. It shall be noted that prior to the STBC encoding, each spatial stream gets allocated a certain amount of bits such that all spatial streams have a same number of SC blocks ($N_{BLKS}$). If required, an appropriate zero padding is performed. For the STBC encoding shown below $N_{BLKS}$ is required to be an even number. For this reason, a further zero padding may be applicable.

STBC encoding for the proposed generalized scheme may work as follows:

The encoded bit stream of each spatial stream r>1 is broken into groups of $N_{CBPB}(r)$ bits, where q denotes the group number. $c(r)=(c_0^q, c_1^q, \ldots, c_{N_{CBPB}(r)-1}^q)$ Each spatial bit stream c(r) is modulated according to the symbol modulation in groups of $N_{CBPS}(r)$ bits, i.e. $(c_{N_{CBPS}(R) \cdot k}^q, c_{N_{CBPS}(r) \cdot k+1}^q, \ldots, c_{N_{CBPS}(r) \cdot k+N_{CBPS}(r)-1}^q)$ is mapped to $d_k^q(r)$ for k=0, ..., $N_{SPB}$-1.

Two symbol blocks are defined $$b^q(r)=(d_0^q(r), d_1^q(r), \ldots, d_{N_{SPB}-1}^q(r))$$

$$b_{inv}^q?(r)=(d_{N_{SPB}-1}^q(r), d_{N_{SPB}-2}^q(r), \ldots, d_0^q(r))$$

where q=0, 1, ..., $N_{BLKS}$-1.

The modulated data symbols for each first space-time stream (i.e. space-time stream index $i_{STS}$=1, 2, ... $I_{STS}$ with $I_{STS}$>2 is odd) is defined as follows $S(i_{STS})=[b^0(r), b^1(r), b^2(r), b^3(r), b^{N_{BLKS}-2}(r), b^{N_{BLKS}-1}(r)]$ with $r=\lceil i_{STS}/2 \rceil$ The modulated data symbols for each second space-time stream (i.e. space-time stream index $i_{STS}$=1, 2, ... $I_{STS}$ with $I_{STS}$>2 is even) is defined as follows $S(i_{STS})=[-b_{inv}^1(r), b_{inv}^0(r), -b_{inv}^3(r), b_{inv}^2(r), \ldots, -b_{inv}^{N_{BLKS}-1}(r), b_{inv}^{N_{BLKS}-2}(r)]^*$ with $r=\lceil i_{STS}/2 \rceil$ where * indicates complex conjugation and ⌈•⌉ denotes ceiling (rounding towards next higher integer) operation.

If the total number of space-time streams is odd, one second space-time stream is not transmitted.

Figure 10:
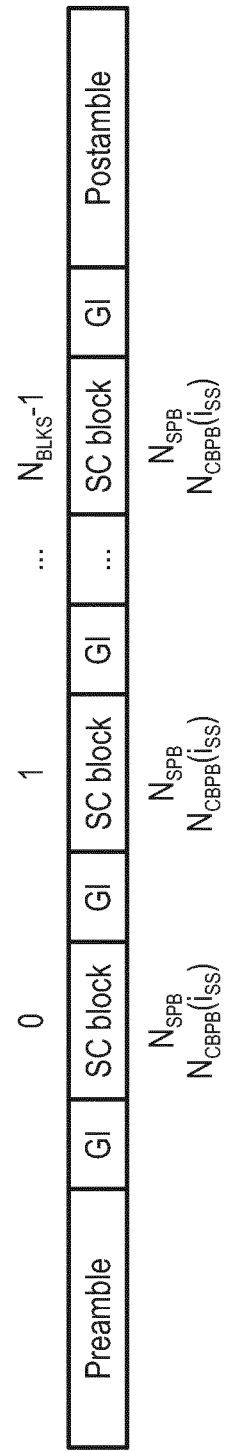
FIG. 10 shows an exemplary symbol blocking structure for single carrier (SC) modulation for single-user (SU) operation.
Figure 11:
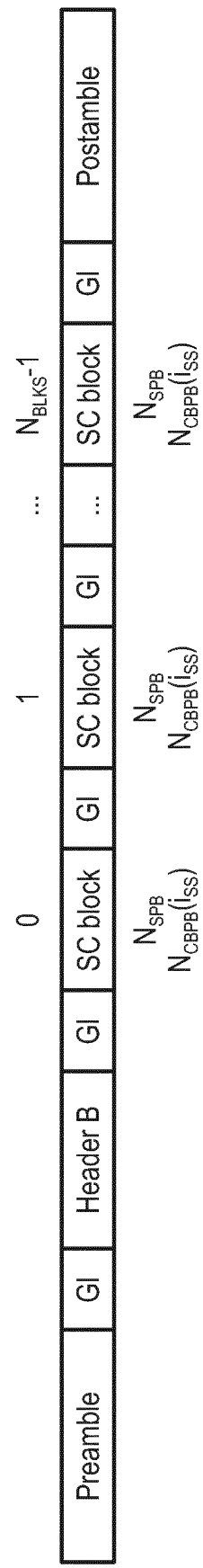
FIG. 11 shows an exemplary symbol blocking structure for SC modulation for multi-user (MU) operation.
Figure 12:
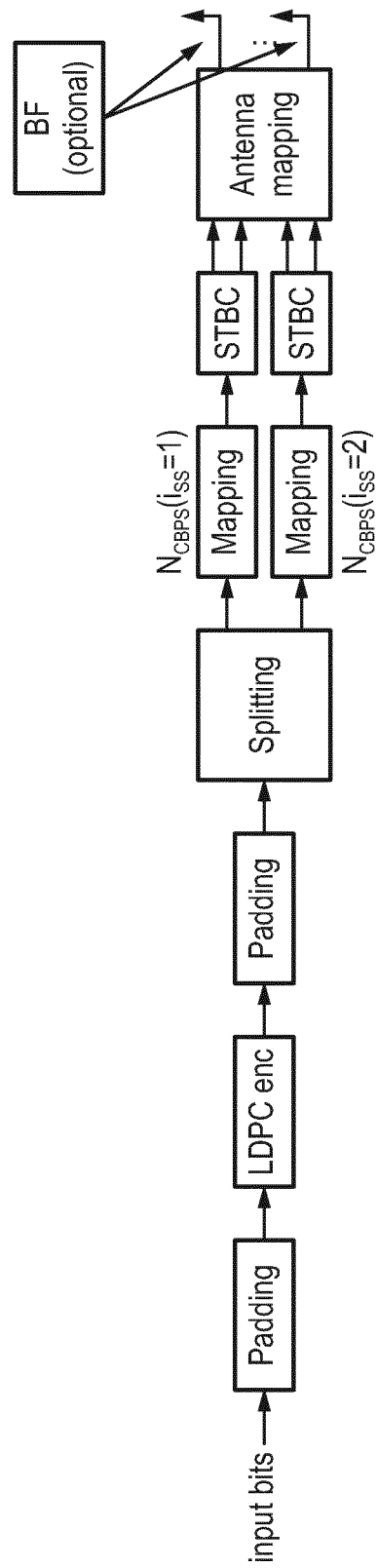
FIG. 12 shows an exemplary bit encoding for SC modulation.

FIG. 10 shows an exemplary symbol blocking structure for SC modulation for single-user (SU) operation and FIG. 11 shows a corresponding symbol blocking structure for multi-user (MU) operation. Furthermore, FIG. 12 shows an exemplary bit encoding for single carrier modulation.

Preferably, for SC modulation space-time block coding uses the same symbol blocking structure for a physical protocol data unit (PPDU) for SU and MU operations.

The STBC for SC preferably performs mapping of $N_{SS}$ spatial streams to $2N_{SS}$ space-time streams. STBC may be applied to an PPDU, in particular an enhanced directional multi-gigabit (EDMG) PPDU if, in the (EDMG-)header, an STBC field is set to 1. The number of STBC modulated spatial streams $N_{SS}$ is preferably given by the number of SS fields in the (EDMG-)header. It is preferred that $N_{SS}$ does not exceed four for a SU PPDU and one per user for an MU PPDU.

The mapping of each spatial stream $i_{SS}=1, \ldots, N_{SS}$ may in a preferred embodiment include the following steps:

The input encoded bits stream of spatial stream $i_{ss}$ is broken into groups of $N_{CBPB}(i_{SS}) \times N_{CB}$ bits, $(c_0^{(q)}, c_1^{(q)}, \ldots, c_{N_{CBPB}(i_{SS}) \times N_{CB}-1})$, where $N_{CBPB}$ denotes the number of coded bits per) SC blocks, $N_{CB}$ denotes the number of bonded channels (preferably 1, 2, 3, 4), and q denotes the group number.

Preferably, the STBC may apply an encoding procedure in which the bit stream entering the STBC is encoded by a LDPC code and bits are distributed to spatial streams according to the number of coded bits per symbol $N_{CBPS}(i_{SS})$. A padding procedure may be required such that the total number of groups of $N_{CBPB}(i_{SS}) \times N_{CB}$ bits, which is the number of SC blocks ($N_{BLKS}$), is an even number.

As depicted in FIG. 12, a first padding may be performed in order to fit the LDPC code word length and a second padding may be performed after the LDPC encoding in order to fit in SC blocks and make SC blocks an even number. The distribution is proportional to $N_{CBPS}(i_{SS})$, i.e. first group of $N_{CBPS}(i_{SS}=1)$ bits goes to $i_{SS}=1$, second group of $N_{CBPS}(i_{SS}=2)$ bits goes to $i_{SS}=2$ and so on. The procedure continuous from beginning when maximum $i_{SS}$ reached and continuous until all bits are distributed.

Each group of bits $(c_{N_{CBPS}(i_{SS}) \cdot k}, c_{N_{CBPS}(i_{SS}) \cdot k+1}, \ldots, c_{N_{CBPS}(i_{SS}) \cdot k+N_{CBPS}(i_{SS})-1})$, $k=0, 1, \ldots, N_{SPB} \times N_{CB}-1$, is converted to the constellation point $d_k^{(q)}(i_{SS})$ such as BPSK, QPSK, 8-PSK, 16-QAM, 64-QAM and 64-NUC, where $N_{SPB}$ denotes the number of symbols per block. The constellation order is given by $N_{CBPS}(i_{SS})$. In some embodiments a continuous pi/2 rotation of the constellation points may be applicable.

Further, STBC may operate with symbol blocks $d^{(q)}(i_{SS}) = (d_0^{(q)}(i_{SS}), d_1^{(q)}(i_{SS}), \ldots, d_{N_{SPB} \times N_{CB}-1}^{(q)}(i_{SS}))$, $q=0, 1, \ldots, N_{BLKS}-1$, and with blocks with inverted symbol order $d_{inv}^{(q)}(i_{SS}) = (d_{N_{SPB} \times N_{CB}-1}^{(q)}(i_{SS}), (d_{N_{SPB} \times N_{CB}-2}^{(q)}(i_{SS}), \ldots, d_0^{(q)}(i_{SS}))$ of spatial stream $i_{SS}$ and may assign these blocks to two space-time streams.

The modulated data symbols for the odd space-time stream may be defined as $s^{i_{STS}=2i_{SS}-1} = (d^{(0)}(i_{SS}), d^{(1)}(i_{SS}), d^{(2)}(i_{SS}), d^{(3)}(i_{SS}), \ldots, d^{(N_{BLKS}-2)}(i_{SS}), d^{(N_{BLKS}-1)}(i_{SS}))$ and the modulated data symbols for the even space-time stream may be defined as $$s^{i_{STS}=2i_{SS}} = \begin{pmatrix} -conj(d_{inv}^{(1)}(i_{SS})), conj(d_{inv}^{(0)}(i_{SS})), \\ -conj(d_{inv}^{(3)}(i_{SS})), conj(d_{inv}^{(2)}(i_{SS})), \ldots \\ \ldots, -conj(d_{inv}^{(N_{BLKS}-1)}(i_{SS})), conj(d_{inv}^{(N_{BLKS}-2)}(i_{SS})) \end{pmatrix}$$

Generally, STBC is also applicable in multicarrier modulation using for instance orthogonal frequency-division multiplexing (OFDM).

Figure 13:
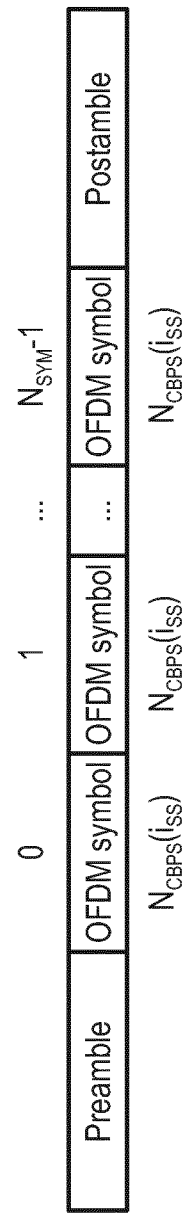
FIG. 13 shows an exemplary symbol blocking structure for multicarrier modulation for single-user operation.
Figure 14:
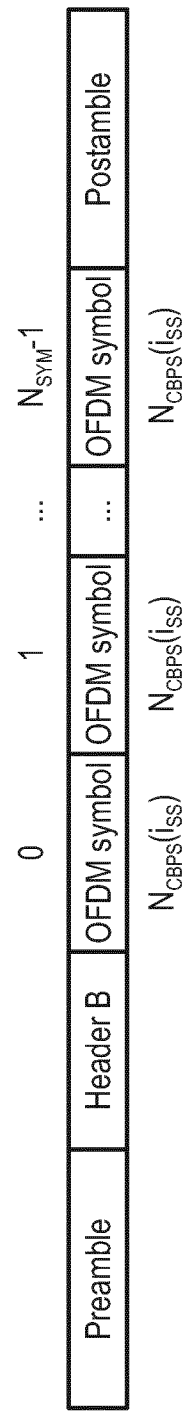
FIG. 14 shows an exemplary symbol blocking structure for multicarrier modulation for multi-user operation.
Figure 15:
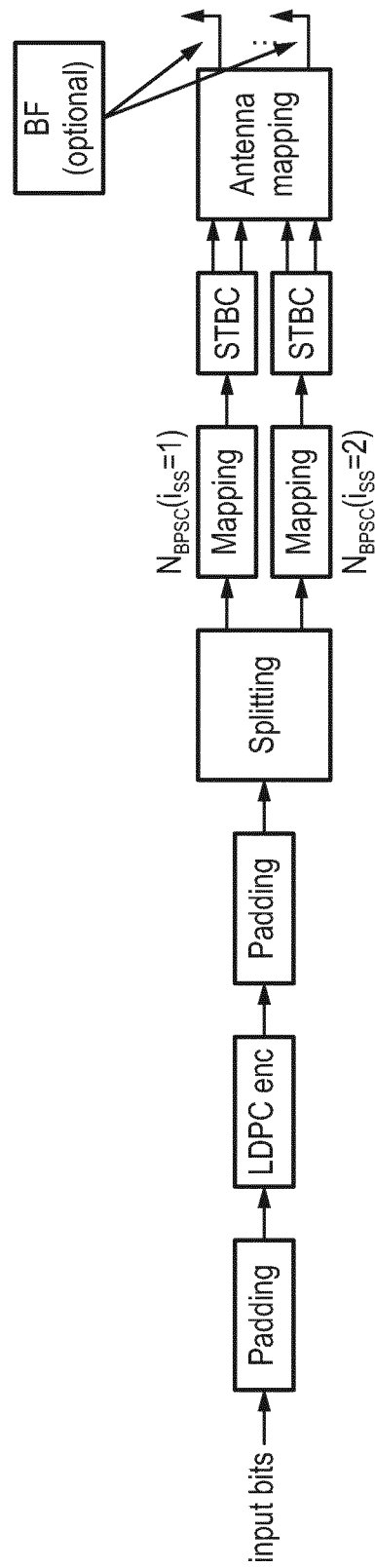
FIG. 15 shows an exemplary bit encoding for multicarrier modulation.

FIG. 13 shows an exemplary symbol blocking structure for multicarrier modulation using OFDM for single-user operation. FIG. 14 shows a corresponding symbol blocking structure for multi-user operation. Furthermore, FIG. 15 shows an exemplary bit encoding for OFDM.

Preferably, space-time block coding for multicarrier modulation uses the same symbol blocking structure for a SU and MU PPDU.

In OFDM mode, space-time block coding maps $N_{SS}$ spatial streams to $2N_{SS}$ space-time streams. STBC may be applied to an (EDMG-)PPDU if, in an (EDMG-) header, the STBC field is set to 1. The number of STBC modulated spatial streams $N_{SS}$ may be given by the number of SS fields in the (EDMG-)header. Preferably, $N_{SS}$ does not exceed four for a SU PPDU and one per user for an MU PPDU.

In an exemplary embodiment the mapping of each spatial stream $i_{SS}=1, \ldots, N_{SS}$ may include the following steps for the data subcarriers mapping:

The input bits of spatial stream $i_{SS}$ are broken into the groups of $N_{CBPS}(i_{SS})$ bits, $$\left( c_0^{(q)}, c_1^{(q)}, \ldots, c_{N_{CBPS}(i_{SS})-1}^{(q)} \right),$$

where q denotes the group number and $N_{CBPS}$ denotes the number of coded bits per symbol (as in SC modulation).

Preferably, the STBC may apply an encoding procedure in which the bit stream entering the STBC is encoded by a LDPC code and bits are distributed to spatial streams according to the number of coded bits per constellation point $N_{BPSC}(i_{SS})$. A padding procedure may be required such that the total number of groups of $N_{CBPS}(i_{SS})$ bits, which is $N_{SYM}$, is an even number.

As depicted in FIG. 15, a first padding may be performed in order to fit the LDPC code word length and a second padding may be performed after the LDPC encoding in order to fit in OFDM symbols and make OFDM symbols an even number. The distribution is proportional to $N_{BPSC}(i_{SS})$, i.e. first group of $N_{BPSC}(i_{SS}=1)$ bits goes to $i_{SS}=1$, second group of $N_{BPSC}(i_{SS}=2)$ bits goes to $i_{SS}=2$ and so on. The procedure continuous from beginning when maximum $i_{SS}$ reached and continuous until all bits are distributed.

Each group of bits $(c_{N_{BPSC}(i_{SS}) \cdot k}^{(q)}, c_{N_{BPSC}(i_{SS}) \cdot k+1}^{(q)}, \ldots, c_{N_{BPSC}(i_{SS}) \cdot k+N_{BPSC}(i_{SS})-1}^{(q)}$, with $k=0, 1, \ldots, N_{SD}-1$ and $N_{SD}$ denoting the number of data subcarriers, may be converted to the constellation point $d(i_{SS},q,k)$, $q=0, 1, \ldots, N_{SYM}-1$, following the rules of BPSK, QPSK, 16-QAM, 64-QAM modulation. The constellation order is given by $N_{BPSC}(i_{SS})$.

The modulated data sequence $D(i_{STS}=2i_{SS}-1, n, k)$ for the odd space-time stream may be defined by inserting zeros from $-N_{SR}$ to $N_{SR}$, where $N_{SR}$ refers to the number of subcarriers occupying half of the overall bandwidth, and then inserting data at tones $M_d(k)$ as follows:

$$D(i_{STS}=2i_{SS}-1, 2n, M_d(k)) = d(2i_{SS}-1, 2n, k),$$

$$D(i_{STS}=2i_{SS}-1, 2n+1, M_d(k)) = d(2i_{SS}-1, 2n+1, k), k=0, 1, \ldots, N_{SD}-1$$

$M_d(k)$ defines a mapping table of data tones, i.e. it defines a mapping between subcarrier number k and physical data tone allocation. For example, $M_d(k=0)=-177$. $M_d(k)$ may depend on channel bandwidth and channel center frequency.

The modulated data sequence $D(i_{STS}=2i_{SS}, n, k)$ for the even space-time stream may be defined by inserting zeros from $-N_{SR}$ to $N_{SR}$ and then inserting data at tones $M_d(k)$ as follows:

$$D(i_{STS}=2i_{SS},2n,M_d(k))=-\text{conj}(2i_{SS},2n+1,k),$$

$$D(i_{STS}=2i_{SS},2n+1,M_d(k))=\text{conj}(d(2i_{SS},2n,k)), k=0, 1, \ldots, N_{SD}-1$$

The modulated pilot sequence $P(i_{STS}=2i_{SS}-1, n, k)$ for the odd space-time stream may be defined by inserting zeros from $-N_{SR}$ to $N_{SR}$ and then inserting pilots at tones $M_p(k)$ as follows:

| $i_{STS}$ | $P_{16}(i_{STS}, :)$ | $P_{12}(i_{STS}, :)$ |
|---|---|---|
| 1 | [+1 +1 +1 −1 +1 +1 −1 +1 +1 +1 +1 −1 −1 −1 +1 −1] | [−1 +1 −1 +1 +1 −1 −1 −1 −1 +1 +1] |
| 2 | [−1 −1 −1 +1 −1 −1 +1 −1 +1 +1 +1 −1 −1 +1 −1] | [+1 −1 +1 +1 −1 −1 −1 −1 +1 +1 −1] |
| 3 | [−1 −1 +1 +1 +1 −1 +1 −1 −1 −1 −1 −1 −1 +1 −1] | [+1 +1 −1 −1 −1 −1 −1 −1 +1 +1 −1 −1 +1 −1 +1 −1] |
| 4 | [+1 +1 +1 −1 −1 −1 −1 −1 −1 −1 −1 −1 +1 +1 +1 −1 +1 −1] | [+1 +1 −1 −1 +1 −1 +1 +1 +1 −1 +1 −1] |
| 5 | [−1 −1 +1 −1 −1 −1 −1 +1 −1 −1 +1 +1 +1 +1 −1] | [+1 −1 −1 −1 +1 −1 −1 +1 −1 +1 −1] |
| 6 | [+1 +1 −1 +1 +1 +1 −1 −1 −1 −1 +1 +1 +1 −1 −1] | [−1 +1 +1 −1 −1 −1 +1 −1 −1 +1 +1] |
| 7 | [+1 +1 −1 −1 −1 −1 +1 +1 −1 +1 +1 +1 +1 −1 −1] | [−1 −1 −1 +1 +1 −1 +1 +1 +1 +1 −1] |
| 8 | [−1 −1 +1 −1 +1 +1 −1 +1 +1 −1 +1 +1 +1 +1 −1] | [−1 −1 −1 −1 +1 −1 +1 −1 +1 +1 −1] |

$$P(i_{STS}=2i_{SS}-1,2n,M_p(k))=P_{NSP}(i_{STS}=2i_{SS}-1,k)\cdot(2p(2n)-1),$$

$$P(i_{STS}=2i_{SS}-1,2n+1,M_p(k))=P_{NSP}(i_{STS}=2i_{SS},k)\cdot(2p(2n+1)-1),$$

with $k=0, 1, \ldots, N_{SP}-1$ and $N_{SP}$ denoting the number of pilot subcarriers.

Here, $M_p(k)$ defines a mapping table of data tones, i.e. it defines a mapping between subcarrier number k and physical data tone allocation. For example $M_p(k=0)=-162$. $M_p(k)$ may depend on channel bandwidth and channel center frequency.

The modulated pilot sequence $P(i_{STS}=2i_{SS}, n, k)$ for the even space-time stream may defined by inserting zeros from $-N_{SR}$ to $N_{SR}$ and then inserting pilots at tones $M_p(k)$ as follows:

$$P(i_{STS}=2i_{SS},2n,M_p(k))=-P_{NSP}(i_{STS}=2i_{SS},k)\cdot(2p(2n)-1),$$

$$P(i_{STS}=2i_{SS},2n+1,M_p(k))=P_{NSP}(i_{STS}=2i_{SS}-1,k)\cdot(2p(2n+1)-1),$$

$$k=0,1,\ldots,N_{SP}-1$$

It shall be noted that $M_p(k)$ and $M_d(k)$ are preferably mutually exclusive, i.e. data and pilot tones do not overlap.

In the above procedure, index $n=0, 1, \ldots, N_{SYM}/2-1$ ($N_{SYM}$ denotes number of OFDM symbols), pilot sequences $P_{NSP}(I_{STS}=2i_{SS}-1, k)$ and $P_{NSP}(I_{STS}=2i_{SS}, k)$ are defined below and p(n) defines a bit coming from a scrambled random bit sequence. The shift register of the scrambler $x_1$, $x_2, \ldots, x_7$ is initialized to all ones for the $n=0$ OFDM symbol.

For QPSK and Staggered-QPSK (SQPSK) modulations, STBC shall apply static tone pairing (STP) subcarriers mapping.

The pilot sequence $P_{NSP}(i_{STS}, :)$ for given number of contiguous channel bandwidth, $N_{CB}$, can be defined as outlined below.

| $N_{CB}$ | $P_{NSP}(i_{STS}, :)$ |
|---|---|
| 1 | $P_{16}(i_{STS}, :)$ |
| 2 | $P_{36}(i_{STS}, :) = [P_{12}(i_{STS}, :), P_{12}(i_{STS}, :), P_{12}(i_{STS}, :)]$ |
| 3 | $P_{56}(i_{STS}, :) = [P_{16}(i_{STS}, :), P_{12}(i_{STS}, :), P_{12}(i_{STS}, :), P_{16}(i_{STS}, :)]$ |
| 4 | $P_{76}(i_{STS}, :) = [P_{16}(i_{STS}, :), P_{16}(i_{STS}, :), P_{12}(i_{STS}, :), P_{16}(i_{STS}, :), P_{16}(i_{STS}, :)]$ |

For example, the pilot sequence $P_{16}(i_{STS}, :)$ and $P_{12}(i_{STS}, :)$ may be defined as:

With OFDM modulation, the transmit signal of the data part may be generated as follows.

The (EDMG-)data transmit waveform for $i_{TX}^{th}$ transmit chain in time domain may be defined at the OFDM sampling rate Fs equal to $N_{CB} \times 2.64$ GHz, $1 \leq N_{CB} \leq 4$, and sample time duration Ts=1/Fs ns as follows:

$$r_{EDMG\text{-}DATA}^{i_{TX}}(qT_s) = \frac{1}{\sqrt{N_{STS} \cdot N_{EDMG\text{-}DATA}^{Tone}}}$$

$$\sum_{n=0}^{N_{SYM}-1} w_{T_{SYM}}(qT_s - nT_{SYM}) \cdot \cdot \sum_{k=-N_{SR}}^{N_{SR}} \sum_{i_{STS}=1}^{N_{STS}} [Q_k]_{i_{TX}, i_{STS}}$$

$$(D(i_{STS}, n, k) + P(i_{STS}, n, k))\exp(j2\pi k\Delta_F(qT_s - nT_{SYM} - T_{GI}))$$

where:
$N_{EDMG\text{-}DATA}^{Tone}=N_{SD}+N_{SP}$ is the total number of active tones;
$N_{STS}$ is the total number of space-time streams;
$T_{SYM}=T_{DFT} \pm T_{GI}$ is the OFDM symbol duration in time domain;
$T_{GI}$ is the guard interval duration;
$Q_k$ is the spatial mapping matrix per $k^{th}$ subcarrier;
$[\ ]_{m,n}$ is a matrix element from $M^{th}$ row and $n^{th}$ column;
$w_{T_{SYM}}(qT_s)$ is a window function applied to smooth the transitions between consecutive OFDM symbols and its definition is implementation specific;
$D(i_{STS}, n, k)$ is the data sequence, it is defined by inserting zeros from $-N_{SR}$ to $N_{SR}$, and then inserting data at the $M_d(k)$ tones as defined above, $D(i_{STS}, n, M_d(k))=d(i_{STS}, n, k)$, for $k=0, 1, \ldots, N_{SD}-1$;
$P(i_{STS}, n, k)$ is the pilot sequence as defined above;
q is a time sample index.

FIG. 16 shows an exemplary capability field for indicating STBC capability. To indicate that a device can encode or decode STBC, capability flags may be used. Those flags indicate that a device is capable of transmitting and/or receiving STBC encoded signals. Several capability flag types with different level of detail can be envisioned, for example:

Two bits/flags indicating that STBC is supported in Tx (transmission) and Rx (reception) mode, independent on the number of spatial streams;

One bit/flag indicating that STBC is supported in Tx, independent of the number of spatial streams;

One or two bits/flags indicating that STBC is supported in Tx plus a number indicating the maximum number of spatial streams to be encoded with STBC;

Two bits/flags indicating that STBC is supported by the receiver with the preferred encoding: 00 (=0) means STBC not supported, 01 (=1) means STBC for one spatial stream supported, 10 (=2) means STBC for one or more spatial streams supported, 11 (=3) reserved. The maximum number of spatial streams the receiver supports may be indicated in a separate value which is sent along with the capability field.

One bit/flag indicating that STBC is supported by the receiver with the preferred encoding: 0 means STBC is not supported, 1 means STBC for one or more spatial streams is supported. The maximum number of spatial streams the receiver supports may be indicated in a separate value which is sent along with the capability field.

Two bits/flags differentiating between Tx and Rx STBC support, independent of the number of spatial streams;

Two bits/flags plus an integer number differentiating between Tx and Rx STBC support and indicating the maximum number of spatial streams to be encoded with STBC which the device is capable to encode/decode.

Generally, a transmitter may determine its modulation based on capability knowledge of a counterpart receiver. Thus, it is not mandatory to indicate transmitter capabilities.

Hence, a transmitter may transmit capability information which indicates support of multi-stream STBC in reception mode. This capability information may include a maximum number of streams which the receiver can handle. Further, a transmitter may receive capability information about multi-stream STBC of his counterpart receiver and sets in the header signaling information to indicate if STBC is set and to how many streams it may be applied for modulation of the data part of the frame.

In association phase, capability information is exchanged between a pair of stations (STAs) which intend to communicate. If capability information allows for STBC operation, STAs may consider STBC encoding when transmitting a data frame.

The transmitting station indicates if STBC has been applied and indicates the number of spatial streams (SS) to be transmitted. Both indications provide sufficient signaling for multiple stream operation with STBC encoding, where the number of Tx antennas is an integer multiple of two (hence, the scheme according to FIG. 3). However, if the generalized scheme according to FIG. 8 is to be applied, the SS field may be reinterpreted as the number of space-time streams. In case the SS field indicates an odd number of space-time streams, the generalized scheme is applied.

It should be noted that the disclosed implementation is only one way to implement the proposed STBC and the corresponding signaling. Other implementations are conceivable that facilitate the disclosed encoding and are embraced by this disclosure.

Furthermore, elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. Transmitter having multiple transmit antennas for transmitting two or more streams, comprising:
    an encoding circuitry configured to perform space-time block encoding to obtain for at least one of the two or more streams a pair of space-time encoded streams;
    a mapping circuitry configured to assign each stream of each pair of space-time encoded streams to a transmit antenna of the multiple transmit antennas for wirelessly transmitting the two or more streams; and
    a control circuitry configured to adjust one or more parameters of the mapping circuitry in order to achieve a defined channel characteristic between the transmitter and a receiver.

2. Transmitter according to (1), wherein the encoding circuitry is configured to encode the two or more streams independently.

3. Transmitter according to (1) or (2), wherein the encoding circuitry is configured to apply to the at least one of the two or more streams Alamouti space-time block encoding such that a code rate of 1 for each pair of space-time encoded streams is achievable, the code rate defining the number of symbols encoded per time slot on an average over the course of one block.

4. Transmitter according to any one of (1) to (3), wherein the control circuitry is further configured to acquire channel feedback from a receiver in order to achieve the defined channel characteristic.

5. Transmitter according to any one of (1) to (4), wherein the channel characteristics are defined by an effective channel matrix seen between the space-time block encoding of the transmitter and a space-time decoding on a receiver, and wherein the control circuitry is configured to transform the effective channel matrix into an essentially block diagonal matrix or into a permutation of an essentially block diagonal matrix in order to achieve the defined channel characteristic.

6. Transmitter according to (5), wherein the mapping circuitry is further configured to assign streams of a first pair of space-time encoded streams such that the first pair of space-time encoded streams is transmitted over a part of the effective channel matrix which has a non-diagonal structure, whereas streams of a further pair of space-time encoded streams are assigned such that the further pair is transmitted over a part of the effective channel matrix which has an essentially diagonal or quasi-diagonal structure.

7. Transmitter according to any one of (1) to (6), further comprising:
    a beamforming circuitry configured to perform a beamforming search in order to obtain knowledge of the desired channel characteristic and/or knowledge of an effective channel matrix.

8. Transmitter according to (7), wherein the control circuitry is further configured to adjust one or more parameters of the mapping circuitry based on the beamforming search in order to obtain the desired channel characteristic.

9. Transmitter according to any one of (1) to (8), further comprising:
a beamforming circuitry for controlling beamforming of the multiple transmit antennas, and
wherein the control circuitry is further configured to adjust one or more parameters of the beamforming circuitry in order to achieve the defined channel characteristic.

10. Transmitter according to any one of (1) to (9), further comprising:
a spatial precoder circuitry configured to perform linear combination and/or weighting of the space-time encoded streams before assigning the space-time encoded streams to the multiple transmit antennas.

11. Transmitter according to (10), wherein the control circuitry is further configured to adjust one or more parameters of the spatial precoder circuitry in order to achieve the defined channel characteristic.

12. Transmitter according to any one of (1) to (11), wherein a first subgroup of streams of the two or more streams is allocated to a first receiver and a second subgroup of streams of the two or more streams is allocated to a further receiver.

13. Transmitter according to (12), wherein the control circuitry is further configured to adjust the one or more parameters of the mapping circuitry in order to achieve a first defined channel characteristic between the transmitter and the first receiver and a second defined channel characteristic between the transmitter and the further receiver.

14. Transmitter according to (13), further comprising a beamforming circuitry for controlling beamforming of the multiple transmit antennas, and
wherein the control circuitry is further configured to adjust one or more parameters of the beamforming circuitry in order to achieve a first defined channel characteristic between the transmitter and the first receiver and a second defined channel characteristic between the transmitter and the further receiver.

15. Transmitter according to (13) or (14), further comprising:
a spatial precoder circuitry configured to perform linear combination and/or weighting of the space-time encoded streams before assigning the space-time encoded streams to the multiple transmit antennas, and
wherein the control circuitry is further configured to adjust one or more parameters of the spatial precoder circuitry in order to achieve a first defined channel characteristic between the transmitter and the first receiver and a second defined channel characteristic between the transmitter and the further receiver.

16. Transmitter according to any one of 1 to (15), wherein the number of multiple transmit antennas is an even number, in particular corresponding to twice the number of streams to be transmitted.

17. Transmitter according to any one of (1) to (16), wherein the number of the multiple transmit antennas is an odd number, and
wherein at least one stream of the two or more streams is not space-time encoded by the encoding circuitry.

18. Transmitter according to (17), wherein the at least one stream, which is not encoded by the encoding circuitry, is combined with the streams encoded by the encoding circuitry using vertical encoding.

19. Transmitter according to any one of (1) to (19), further comprising signaling circuitry for signaling support for multiple stream STBC.

20. Transmitter according to (19), wherein the signaling circuitry is configured to transmit a capability field comprising at least a one bit flag indicating that multiple stream STBC is supported.

21. Transmitter according to (20), wherein the signaling circuitry is further configured to transmit a value along with the capability field indicating the maximum number of spatial streams for STBC.

22. Receiver for receiving two or more streams from a transmitter, comprising
one or more receive antennas configured to capture a transmit signal from a transmitter,
one or more decoding circuitry for decoding space-time encoded streams, and
an output circuitry for outputting the two or more streams transmitted from the transmitter,
wherein at least one of the two or more streams from the transmitter is space-time encoded into a pair of space-time encoded streams, and
wherein the decoding circuitry is configured to decode the at least one pair of space-time encoded streams in order to receive one of the two or more streams transmitted from the transmitter.

23. Receiver according to (22), further comprising signaling circuitry for signaling support for multiple stream STBC.

24. Receiver according to (23), wherein the signaling circuitry is configured to transmit a capability field comprising at least a one bit flag indicating that multiple stream STBC is supported in a reception mode.

25. Receiver according to (24), wherein the signaling circuitry is further configured to transmit a value along with the capability field indicating the maximum number of spatial streams for STBC.

26. Transmission method for transmitting two or more streams via multiple transmit antennas, the method comprising the steps of:
performing, with an encoding circuitry, space-time block encoding to obtain for at least one of the two or more streams a pair of space-time encoded streams;
assigning, with a mapping circuitry, each stream of each pair of space-time encoded streams to a transmit antenna of the multiple transmit antennas for wirelessly transmitting the two or more streams; and
adjusting, with a control circuitry, one or more parameters of the mapping circuitry in order to achieve a defined channel characteristic between the transmitter and a receiver.

27. A non-transitory computer-readable recording medium that stores therein a computer program product, which, when executed by a processor, causes the method according to (26) to be performed.

28. Transceiver comprising a transmitter according to any one of (1) to (21) and a receiver according to any one of (22) to (25).

29. Transmitter having multiple transmit antennas for transmitting two or more streams, comprising:
an encoding circuitry configured to perform space-time block encoding to obtain for at least one of the two or more streams a pair of space-time encoded streams;
a mapping circuitry configured to assign each stream of each pair of space-time encoded streams to a separate transmit antenna of the multiple transmit antennas for wirelessly transmitting the two or more streams; and
a control circuitry configured to adjust one or more parameters of the mapping circuitry in order to achieve a defined channel characteristic between the transmitter and a receiver.

30. Transmission method for transmitting two or more streams via multiple transmit antennas, the method comprising the steps of:
  performing, with an encoding circuitry, space-time block encoding to obtain for at least one of the two or more streams a pair of space-time encoded streams;
  assigning, with a mapping circuitry, each stream of each pair of space-time encoded streams to a separate transmit antenna of the multiple transmit antennas for wirelessly transmitting the two or more streams; and
  adjusting, with a control circuitry, one or more parameters of the mapping circuitry in order to achieve a defined channel characteristic between the transmitter and a receiver.

The invention claimed is:

1. Transmitter having multiple transmit antennas for transmitting two or more streams, comprising:
  an encoding circuitry configured to perform space-time block encoding to obtain for at least one of the two or more streams a pair of space-time encoded streams;
  a mapping circuitry configured to assign each stream of each pair of space-time encoded streams to a transmit antenna of the multiple transmit antennas for wirelessly transmitting the two or more streams; and
  a control circuitry configured to adjust one or more parameters of the mapping circuitry in order to achieve a defined channel characteristic that reduces interference between the two or more streams transmitted between the transmitter and a receiver,
  wherein a first subgroup of streams of the two or more streams is allocated to a first receiver and a second subgroup of streams of the two or more streams is allocated to a further receiver.

2. Transmitter according to claim 1, wherein the encoding circuitry is configured to encode the two or more streams independently.

3. Transmitter according to claim 1, wherein the encoding circuitry is configured to apply to the at least one of the two or more streams Alamouti space-time block encoding such that a code rate of 1 for each pair of space-time encoded streams is achievable, the code rate defining the number of symbols encoded per time slot on an average over the course of one block.

4. Transmitter according to claim 1, wherein the control circuitry is further configured to acquire channel feedback from a receiver in order to achieve the defined channel characteristic.

5. Transmitter according to claim 1, wherein the channel characteristics are defined by an effective channel matrix seen between the space-time block encoding of the transmitter and a space-time decoding on a receiver, and
  wherein the control circuitry is configured to transform the effective channel matrix into an essentially block diagonal matrix or into a permutation of an essentially block diagonal matrix in order to achieve the defined channel characteristic.

6. Transmitter according to claim 5, wherein the mapping circuitry is further configured to assign streams of a first pair of space-time encoded streams such that the first pair of space-time encoded streams is transmitted over a part of the effective channel matrix which has a non-diagonal structure, whereas streams of a further pair of space-time encoded streams are assigned such that the further pair is transmitted over a part of the effective channel matrix which has an essentially diagonal or quasi-diagonal structure.

7. Transmitter according to claim 1, further comprising:
  a beamforming circuitry configured to perform a beamforming search in order to obtain knowledge of the desired channel characteristic and/or knowledge of an effective channel matrix.

8. Transmitter according to claim 7, wherein the control circuitry is further configured to adjust one or more parameters of the mapping circuitry based on the beamforming search in order to obtain the desired channel characteristic.

9. Transmitter according to claim 1, further comprising:
  a beamforming circuitry for controlling beamforming of the multiple transmit antennas, and
  wherein the control circuitry is further configured to adjust one or more parameters of the beamforming circuitry in order to achieve the defined channel characteristic.

10. Transmitter according to claim 1, further comprising:
  a spatial precoder circuitry configured to perform linear combination and/or weighting of the space-time encoded streams before assigning the space-time encoded streams to the multiple transmit antennas.

11. Transmitter according to claim 10, wherein the control circuitry is further configured to adjust one or more parameters of the spatial precoder circuitry in order to achieve the defined channel characteristic.

12. Transmitter according to claim 1, wherein the control circuitry is further configured to adjust the one or more parameters of the mapping circuitry in order to achieve a first defined channel characteristic between the transmitter and the first receiver and a second defined channel characteristic between the transmitter and the further receiver.

13. Transmitter according to claim 12, further comprising a beamforming circuitry for controlling beamforming of the multiple transmit antennas, and
  wherein the control circuitry is further configured to adjust one or more parameters of the beamforming circuitry in order to achieve a first defined channel characteristic between the transmitter and the first receiver and a second defined channel characteristic between the transmitter and the further receiver.

14. Transmitter according to claim 12, further comprising:
  a spatial precoder circuitry configured to perform linear combination and/or weighting of the space-time encoded streams before assigning the space-time encoded streams to the multiple transmit antennas,
  wherein the control circuitry is further configured to adjust one or more parameters of the spatial precoder circuitry in order to achieve a first defined channel characteristic between the transmitter and the first receiver and a second defined channel characteristic between the transmitter and the further receiver.

15. Transmitter according to claim 1, wherein the number of multiple transmit antennas is an even number, in particular, corresponding to twice the number of streams to be transmitted.

16. Transmitter according to claim 1, wherein the number of the multiple transmit antennas is an odd number, and
  wherein at least one stream of the two or more streams is not space-time encoded by the encoding circuitry.

17. Transmitter according to claim 16, wherein the at least one stream, which is not encoded by the encoding circuitry, is combined with the streams encoded by the encoding circuitry using vertical encoding.

18. Transmitter according to claim 1, further comprising signaling circuitry for signaling support for multiple stream STBC.

19. Transmitter according to claim 18, wherein the signaling circuitry is configured to transmit a capability field comprising at least a one bit flag indicating that multiple stream STBC is supported.

20. Transmitter according to claim 19, wherein the signaling circuitry is further configured to transmit a value along with the capability field indicating the maximum number of spatial streams for STBC.

21. Receiver for receiving two or more streams from a transmitter, comprising
one or more receive antennas configured to capture a transmit signal from a transmitter,
one or more decoding circuitry for decoding space-time encoded streams,
signaling circuitry for evaluation of signaling information for multiple stream STBC, and
an output circuitry for outputting the two or more streams transmitted from the transmitter,
wherein at least one of the two or more streams from the transmitter is space-time encoded into a pair of space-time encoded streams, and
wherein the decoding circuitry is configured to decode the at least one pair of space-time encoded streams in order to receive one of the two or more streams transmitted from the transmitter.

22. Receiver according to claim 21, wherein the signaling circuitry is configured to transmit a capability field comprising at least a one bit flag indicating that multiple stream STBC is supported in a reception mode.

23. Receiver according to claim 22, wherein the signaling circuitry is further configured to transmit a value along with the capability field indicating the maximum number of spatial streams for STBC.

24. Transmission method for transmitting two or more streams via multiple transmit antennas, the method comprising the steps of:
performing, with an encoding circuitry, space-time block encoding to obtain for at least one of the two or more streams a pair of space-time encoded streams;
assigning, with a mapping circuitry, each stream of each pair of space-time encoded streams to a transmit antenna of the multiple transmit antennas for wirelessly transmitting the two or more streams; and
adjusting, with a control circuitry, one or more parameters of the mapping circuitry in order to achieve a defined channel characteristic that reduces interference between the two or more streams transmitted between the transmitter and a receiver,
wherein a first subgroup of streams of the two or more streams is allocated to a first receiver and a second subgroup of streams of the two or more streams is allocated to a further receiver.

25. A system comprising:
a transmitter having multiple transmit antennas for transmitting two or more streams, the transmitter configured to
perform space-time block encoding to obtain for at least one of the two or more streams a pair of space-time encoded streams;
assign each stream of each pair of space-time encoded streams to a transmit antenna of the multiple transmit antennas for wirelessly transmitting the two or more streams; and
adjust one or more parameters of the assigning to achieve a defined channel characteristic that reduces interference between the two or more streams transmitted between the transmitter and a receiver; and
the receiver for receiving two or more streams from the transmitter, the receiver comprising
one or more receive antennas configured to capture a transmit signal from the transmitter;
decoding circuitry configured to decode space-time encoded streams; and
output circuitry configured to output the two or more streams transmitted from the transmitter, wherein
at least one of the two or more streams from the transmitter is space-time encoded into a pair of space-time encoded streams, and
the decoding circuitry is configured to decode the at least one pair of space-time encoded streams in order to receive one of the two or more streams transmitted from the transmitter,
wherein a first subgroup of streams of the two or more streams is allocated to a first receiver and a second subgroup of streams of the two or more streams is allocated to a further receiver.

26. Transmitter having multiple transmit antennas for transmitting two or more streams, comprising:
an encoding circuitry configured to perform space-time block encoding to obtain for at least one of the two or more streams a pair of space-time encoded streams;
a mapping circuitry configured to assign each stream of each pair of space-time encoded streams to a transmit antenna of the multiple transmit antennas for wirelessly transmitting the two or more streams;
a control circuitry configured to adjust one or more parameters of the mapping circuitry in order to achieve a defined channel characteristic that reduces interference between the two or more streams transmitted between the transmitter and a receiver, and
signaling circuitry for signaling support for multiple stream STBC.

27. Transmission method for transmitting two or more streams via multiple transmit antennas, the method comprising the steps of:
performing, with an encoding circuitry, space-time block encoding to obtain for at least one of the two or more streams a pair of space-time encoded streams;
assigning, with a mapping circuitry, each stream of each pair of space-time encoded streams to a transmit antenna of the multiple transmit antennas for wirelessly transmitting the two or more streams;
adjusting, with a control circuitry, one or more parameters of the mapping circuitry in order to achieve a defined channel characteristic that reduces interference between the two or more streams transmitted between the transmitter and a receiver, and
signaling support for multiple stream STBC.

28. A system comprising:
a transmitter having multiple transmit antennas for transmitting two or more streams, the transmitter configured to:
perform space-time block encoding to obtain for at least one of the two or more streams a pair of space-time encoded streams;
assign each stream of each pair of space-time encoded streams to a transmit antenna of the multiple transmit antennas for wirelessly transmitting the two or more streams;
adjust one or more parameters of the assigning to achieve a defined channel characteristic that reduces interference between the two or more streams transmitted between the transmitter and a receiver; and
signal support for multiple stream STBC; and the receiver for receiving two or more streams from the transmitter, the receiver comprising:
  one or more receive antennas configured to capture a transmit signal from the transmitter;
  decoding circuitry configured to decode space-time encoded streams; and
  output circuitry configured to output the two or more streams transmitted from the transmitter,
wherein at least one of the two or more streams from the transmitter is space-time encoded into a pair of space-time encoded streams, and
the decoding circuitry is configured to decode the at least one pair of space-time encoded streams in order to receive one of the two or more streams transmitted from the transmitter.

* * * * *